No. 779,436. PATENTED JAN. 10, 1905.
L. MYERS.
TYPE BAR BEARING FOR TYPE WRITERS.
APPLICATION FILED MAR. 5, 1903.
2 SHEETS—SHEET 1.
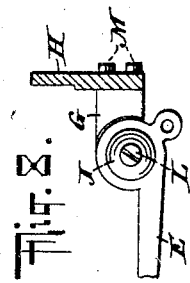
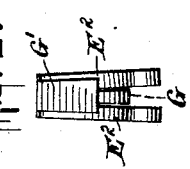
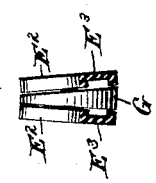
WITNESSES:
John A. Stehlenbeck
John Loska
INVENTOR
Louis Myers
BY
Briesen & Knauth
ATTORNEYS No. 779,436. PATENTED JAN. 10, 1905.
L. MYERS.
TYPE BAR BEARING FOR TYPE WRITERS.
APPLICATION FILED MAR. 5, 1903.
2 SHEETS—SHEET 2.
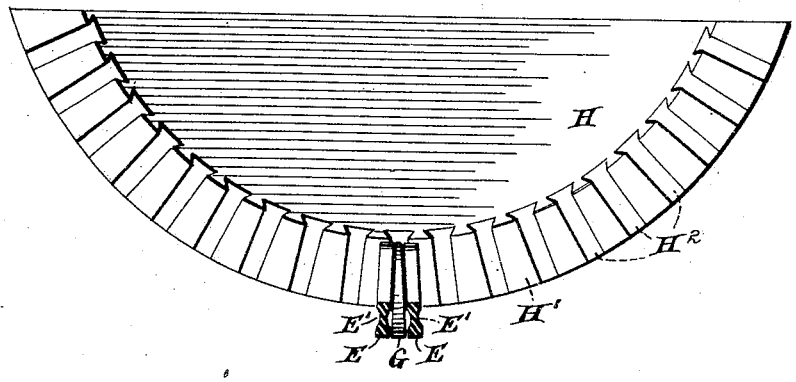
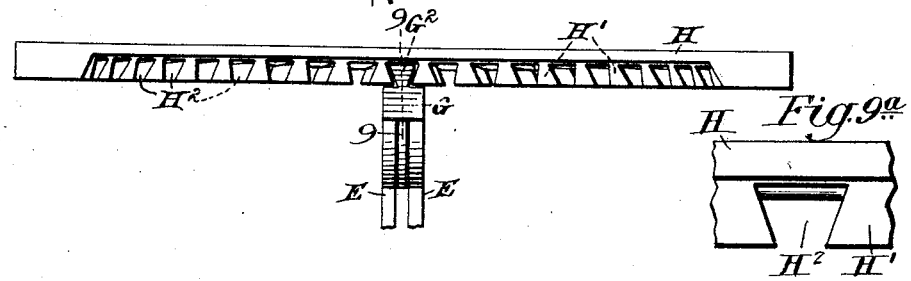
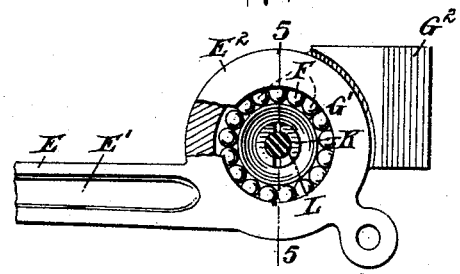
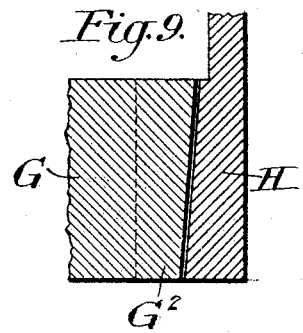
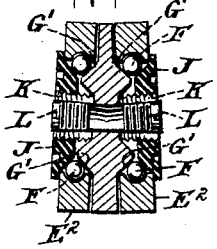
WITNESSES:
John A. Kehlenbeck.
John Lofka
INVENTOR
Louis Myers
BY
ATTORNEYS No. 779,436.   Patented January 10, 1905.

UNITED STATES PATENT OFFICE.

LOUIS MYERS, OF HARTFORD, CONNECTICUT, ASSIGNOR TO UNDERWOOD TYPEWRITER COMPANY, OF NEW YORK, N. Y., A CORPORATION OF NEW JERSEY.

TYPE-BAR BEARING FOR TYPE-WRITERS.

SPECIFICATION forming part of Letters Patent No. 779,436, dated January 10, 1905.

Application filed March 5, 1903. Serial No. 146,300.

*To all whom it may concern:*

Be it known that I, LOUIS MYERS, a citizen of the United States, and a resident of Hartford, Hartford county, and State of Connecticut, have invented certain new and useful Improvements in Type-Bar Bearings for Type-Writers, of which the following is a specification.

My invention relates to type-writers and like machines, and has for its object to so mount or support the type-bars that they will move very easily and will be held against lateral movement; and a further object is to enable the type-bars to be set very close together, while at the same time preserving a strong and rigid bearing.

To this end my invention consists of certain features of construction and arrangements of parts, as will be fully described hereinafter and specifically pointed out in the appended claims.

Reference is to be had to the accompanying drawings, in which—

Figure 1 is a sectional elevation from front to rear of a type-writer provided with my improvement. Fig. 2 is a front elevation of the segment carrying the type-bar bearings or hangers. Fig. 3 is a top view of the segment. Fig. 4 is an enlarged side elevation of the type-bar and its bearing with parts removed. Fig. 5 is a cross-section on line 5 5 of Fig. 4. Figs. 6 and 7 illustrate the details of a slightly different form of my invention in rear elevation and sectional front elevation, respectively. Fig. 8 shows a different mode of attaching the hangers to the segment. Fig. 9 is a detail sectional elevation on line 9 9 of Fig. 3, and Fig. $9^a$ is a top view of the central portion of the segment with the type-bar hanger removed.

The type-bar action—that is, the mechanism for throwing the type-bar to the printing position—may be of any suitable construction. I have shown a key-lever A, fulcrumed at A' upon the frame B and having a pin-and-slot connection $A^2$ with an elbow-lever C, fulcrumed at C' and connected by a link D with the type-bar E. This type-bar may be grooved longitudinally on both sides, as shown in Figs. 1 and 2, so as to produce a reduced web or stem E' and reinforced edge portions, thereby giving the type-bar great rigidity. The type-bars are arranged in pairs, as shown in Figs. 2, 3, and 5, and are formed with annular bearing portions $E^2$, grooved on their inner surfaces to form races for balls F. These balls also engage beveled or conical shoulders G' upon hangers G, carried by the segment H. Each hanger has two such shoulders, one on each side. On the outside the balls F are engaged by caps J, having conical shoulders, said caps being screwed upon expansible threaded sleeves K, integral with and projected from the hanger. Conical screws L fit into the sleeves K to expand them. These sleeves do not aline with each other, but are located at an angle to each other, so that the two type-bars mounted on the same hanger swing in different planes. The hanger is accordingly reduced in thickness from bottom to top, as shown in Figs. 2 and 5.

The manner of securing the hangers G to the support or segment H may vary. In Figs. 1 to 5 the segment has a curved bottom rib H', provided with radial dovetail grooves $H^2$, contracted toward their lower ends, as shown in Figs. 9 and $9^a$, and into these grooves are fitted dovetail ribs $G^2$ on the hangers G. It will therefore be understood that the number of the grooves $H^2$ is only one-half the number of type-bars E, and thus a very strong construction of the segment is obtained notwithstanding a very close arrangement of the type-bars. Owing to the rigidity of the type-bars and to the extended bearing they have at their pivots they swing perfectly true without lateral looseness, thus avoiding one type-bar's getting caught in its neighbor when two adjacent type-bars are operated in quick succession.

In Figs. 6 and 7 the stem $E^3$ instead of being located centrally is arranged at one side and flush with the outer surfaces of the reinforced edge portions of the type-bars. In Fig. 2 the stem E' is shown centrally located, thus forming practically an I in cross-section, while in Fig. 7 the stem being located at one side the type-bar is practically a U in cross-section, the outer surfaces of the type-bar being entirely smooth in this structure. This further reduces the liability of entanglement of two neighboring type-bars.

According to Fig. 8 the dovetail connection of the hangers G with the segment H is suppressed, and in its stead I employ screws M for securing each hanger to the segment.

An important advantage of my invention is found in the fact that each hanger is independently removable from the segment and each type-bar is independently removable from its hanger. Repairs are therefore greatly facilitated. Any oil dropped into the ball-bearings will be retained therein.

Various modifications may be made without departing from the nature of my invention.

What I claim as new, and desire to secure by Letters Patent, is—

1. In a type-writer or like machine, a support, a plurality of hangers having a dovetail connection with said support, the members of said connection being contracted toward one end, and type-bars carried by said hangers.

2. In a type-writer, or like machine, a support, hangers on said support, each hanger having cones on opposite faces, type-bars located on each side of a hanger and provided with annular pivot portions having interior ball-races, balls interposed between the type-bars and said cones, caps arranged to engage the outer surfaces of the balls, sleeves on which said caps screw, and expanding-screws within said sleeves.

In testimony whereof I have signed my name to this specification in the presence of two subscribing witnesses.

LOUIS MYERS.

Witnesses:
JOHN LOTKA,
OTTO V. SCHRENK.